(No Model.)  6 Sheets—Sheet 1.
P. J. OLSON.
GRAIN BINDER.
No. 273,761.  Patented Mar. 13, 1883.
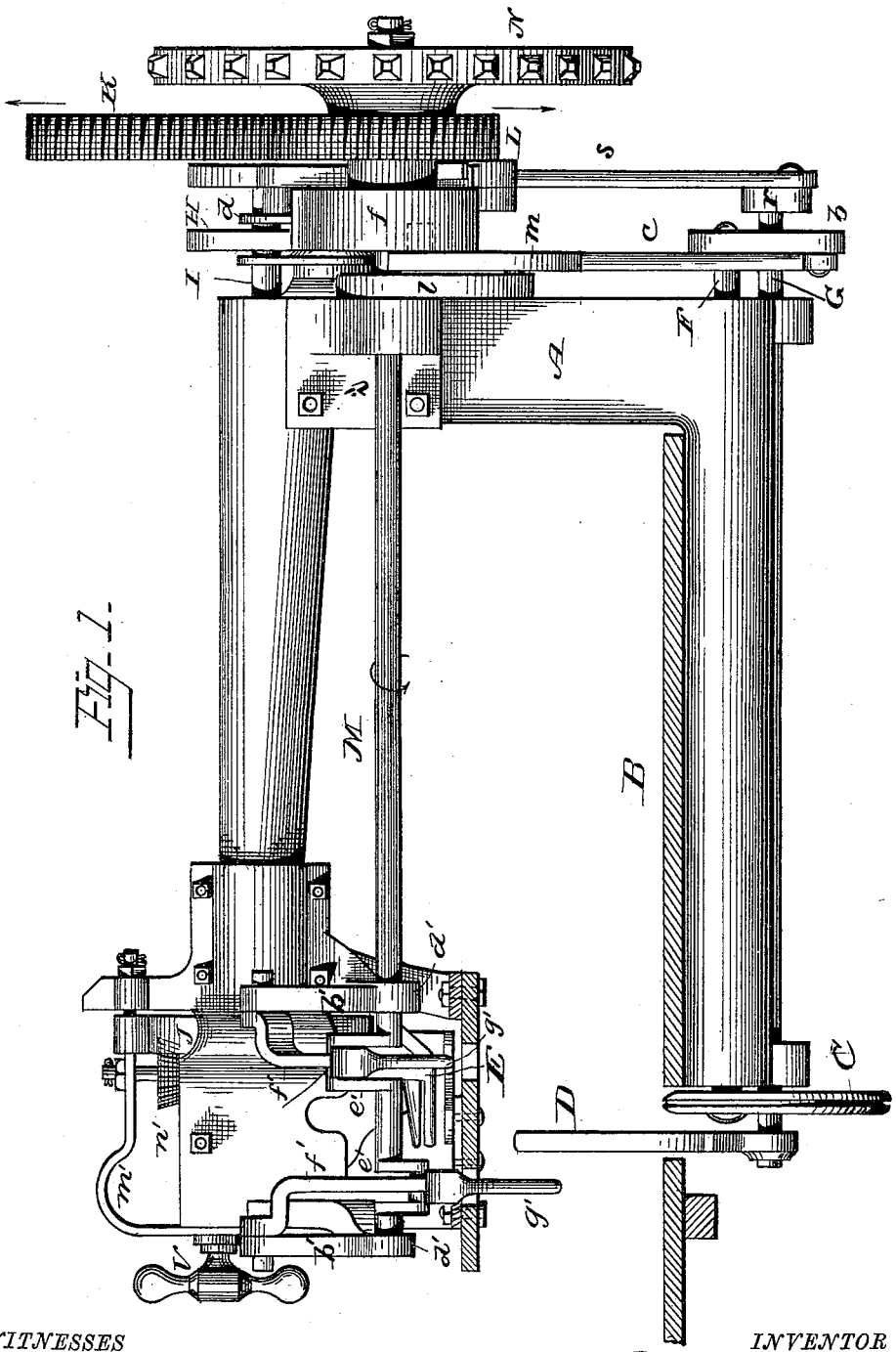
WITNESSES
Franck L. Ourand
Walter S. Dodge
INVENTOR
Peter J. Olson,
by Dodge & Son,
Attorneys.

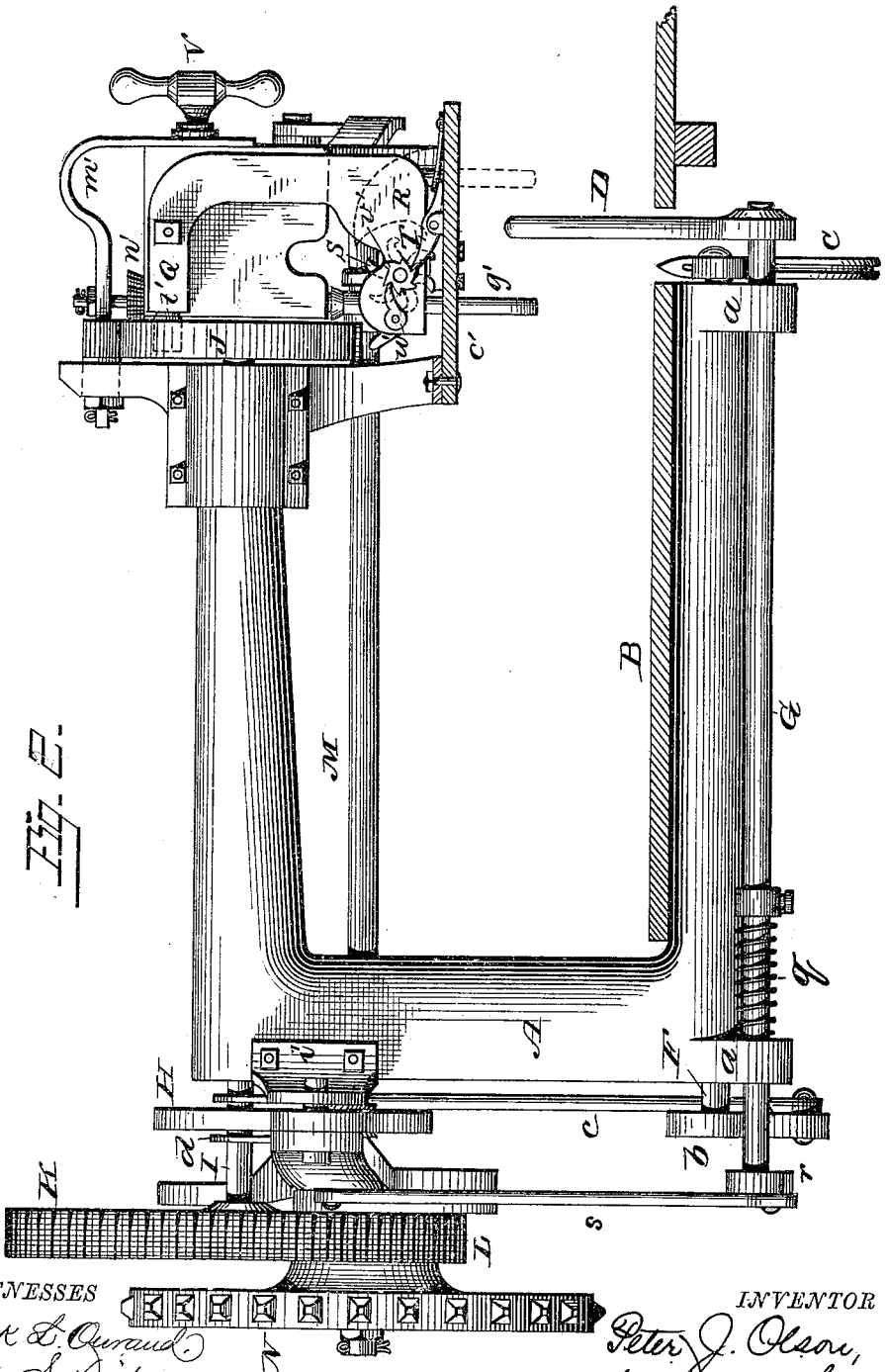

(No Model.) 6 Sheets—Sheet 3.
P. J. OLSON.
GRAIN BINDER.
No. 273,761. Patented Mar. 13, 1883.
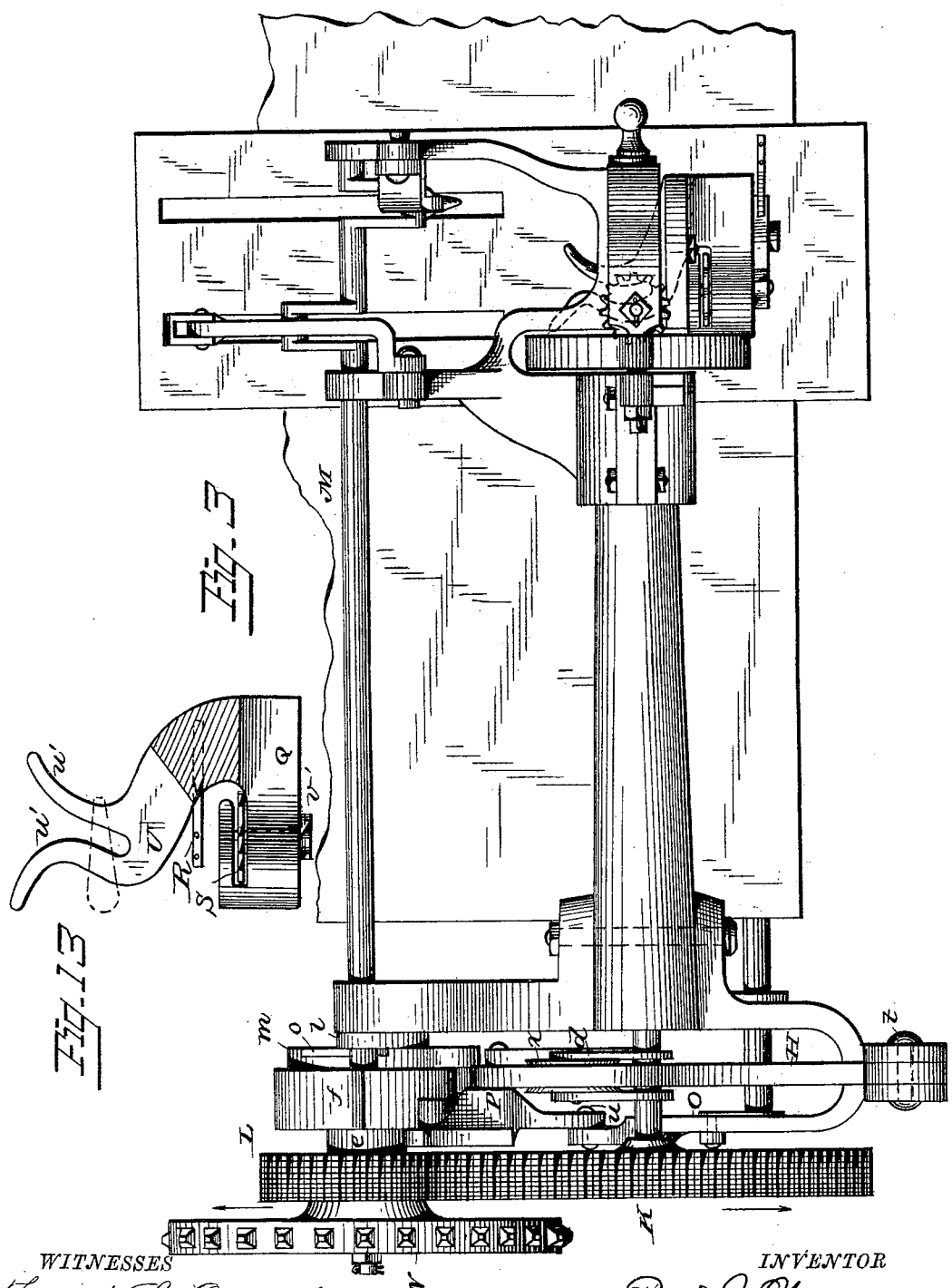
WITNESSES
INVENTOR (No Model.) 6 Sheets—Sheet 4.
P. J. OLSON.
GRAIN BINDER.
No. 273,761. Patented Mar. 13, 1883.
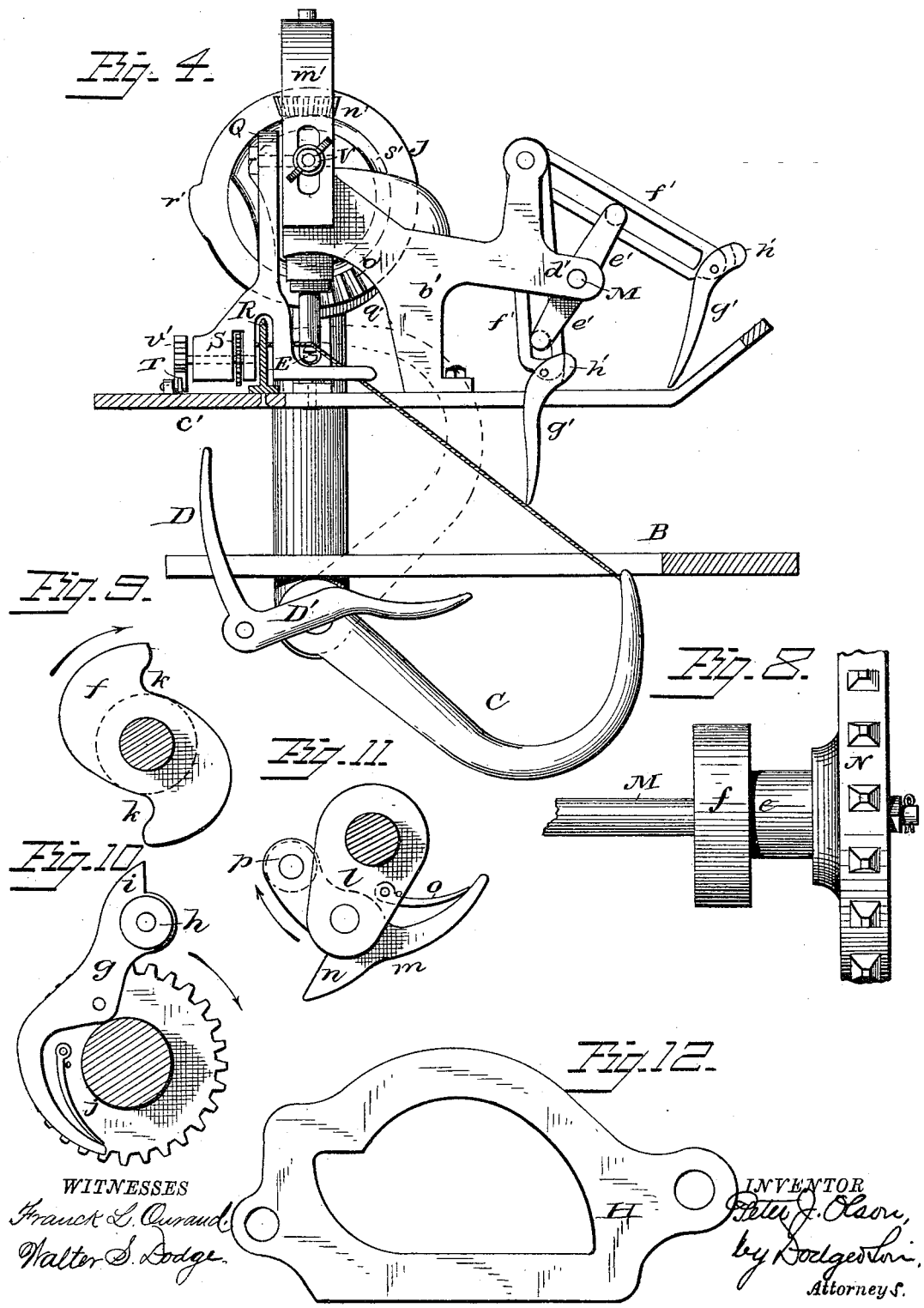
WITNESSES
Franck L. Ourand
Walter S. Dodge
INVENTOR
Peter J. Olson,
by Dodge & Son,
Attorneys (No Model.) 6 Sheets—Sheet 5.
P. J. OLSON.
GRAIN BINDER.
No. 273,761. Patented Mar. 13, 1883.
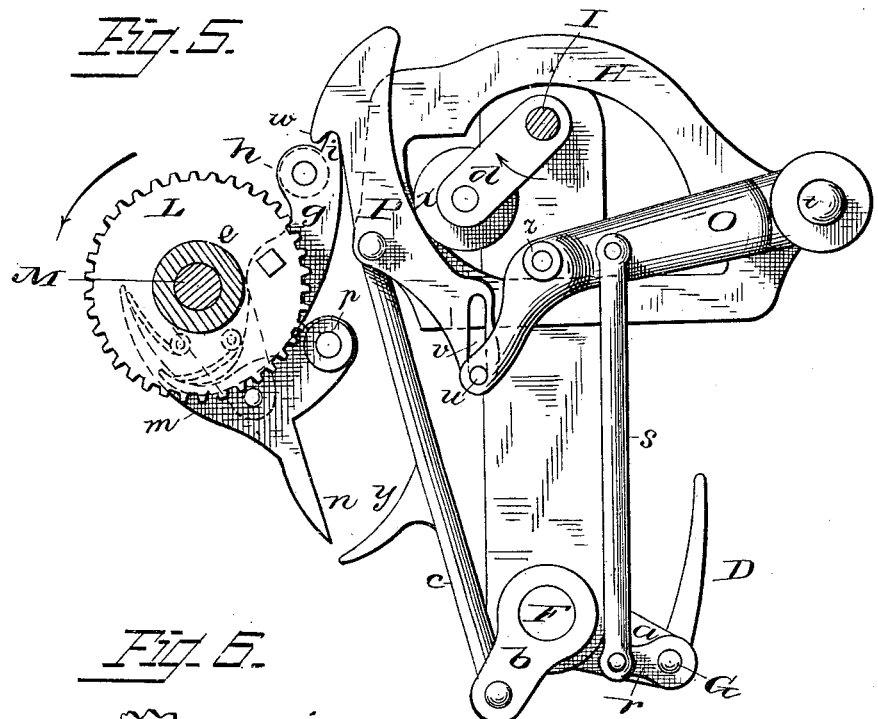
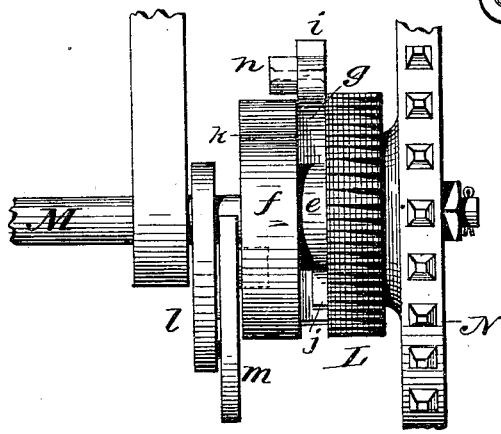
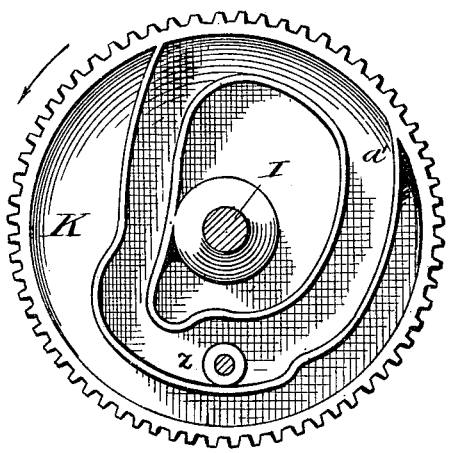
WITNESSES:
Franck L. Durand
Walter S. Dodge
INVENTOR
Peter J. Olson,
by Dodge Son,
Attorneys.

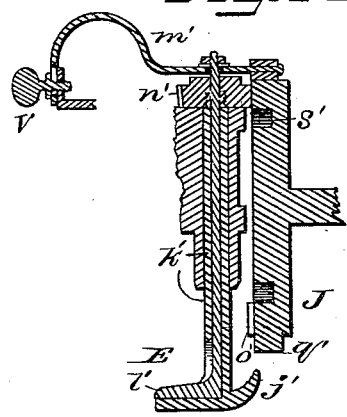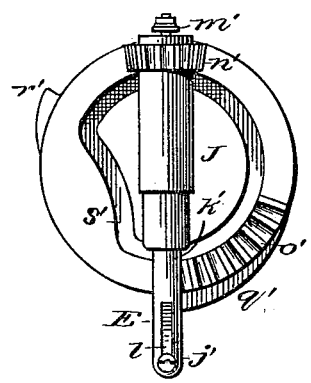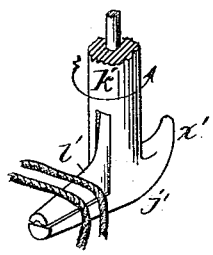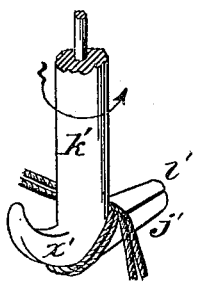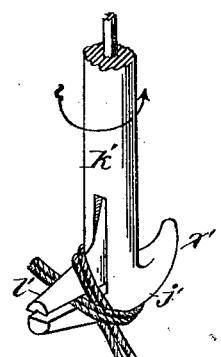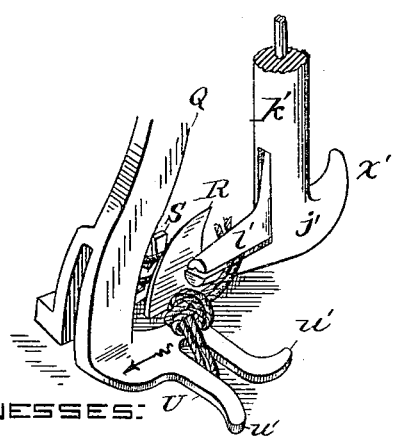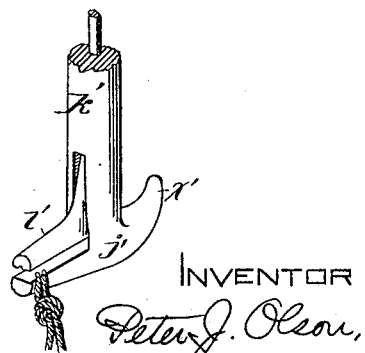

UNITED STATES PATENT OFFICE.

PETER J. OLSON, OF NORTHFIELD, MINNESOTA, ASSIGNOR OF ONE-HALF TO ARTHUR E. BOWE AND CHARLES R. COOK, BOTH OF SAME PLACE.

GRAIN-BINDER.

SPECIFICATION forming part of Letters Patent No. 273,761, dated March 13, 1883.

Application filed August 23, 1882. (No model.)

*To all whom it may concern:*

Be it known that I, PETER J. OLSON, of Northfield, in the county of Rice and State of Minnesota, have invented certain Improvements in Machines for Binding Grain, of which the following is a specification.

My invention relates to that class of machines for binding grain in which packing arms or devices move the grain against a yielding arm or trip-lever, which yields when the required amount of grain has been accumulated to form a bundle, and in thus moving back throws the packers out of action and brings into operation first the binder-arm and later the band fastening and severing mechanism.

The improvements consist in numerous features and details of construction, hereinafter fully set forth and explained, but particularly in a trip mechanism of peculiar construction; in an improved form of packers and mechanism for operating the same; in a knotter of improved form and mechanism for operating the same; in a swinging arm carrying a cord-guide, which serves also as a stripper, and also provided with a clamping-wheel to retain the end of the main band or cord; in a spring-pawl and a knife, both permanently secured upon the frame of the machine, the first to actuate the cord-clamping wheel and second to sever the cords brought against it by the stripper; in slotting or recessing the swinging stripper-arm to pass over the knife and shield it from the cord until the time for severing the band, and in other features, more fully explained hereinafter.

In the accompanying drawings, Figure 1 represents a side elevation of my improved machine, looking from the side on which the grain is received; Fig. 2, a similar side elevation from the rear or discharge side; Fig. 3, a top plan view; Fig. 4, an end elevation, partly in section, facing the end which overhangs the grain table or platform; Fig. 5, an enlarged view, illustrating the arrangement and action of clutch mechanism operated by the trip arm or lever; Fig. 6, a top plan view of the clutching mechanism; Fig. 7, an inner face view of the cam and gear wheel by which the binder-arm and bundle-ejector are operated; Figs. 8, 9, 10, and 11, views showing parts of the clutching mechanism detached and separated; Fig. 12, a face view of the yoke by which the movements of the binder-arm and the ejector are produced; Fig. 13, a plan view of the cord-guide and stripper; Figs. 14, 15, 16, 17, 18, 19, and 20, views illustrating the construction and operation of the knot-tyer and attendant devices.

The purpose of my invention is to simplify and cheapen the construction of grain-binding machines, and particularly to render them strong and compact, avoiding, as far as practicable, the use of small and delicate parts, which are liable to become broken or disarranged.

In order to attain these objects, I construct a frame, A, of the form shown in Figs. 1 and 2, consisting of an upper horizontal arm extending inward over the grain table or platform, a lower horizontal arm extending inward beneath said platform, and a vertical post or pillar connecting said arms and constituting the main support of the mechanism; and in or upon this frame I mount the binder-arm shaft, the knotter-shaft, the packer-shaft, the trip-shaft, and all the parts actuated by or serving to actuate said shafts, so that the entire apparatus may be moved about complete in itself and applied to any style of harvester to which it is adapted with facility and ease. The frame A is preferably cast with the two horizontal arms and the upright pillar complete in one piece, to secure strength and lightness, as well as to reduce the cost, and it is made of hollow or tubular form throughout to give the greatest strength for the weight of material, and also to accommodate the shafts, as presently explained. The frame A, with its attendant parts, is firmly bolted or otherwise secured to the framing of a harvester of any approved or common construction, its inner end overhanging a grain table or platform, B, and extending to about the middle thereof, at which point the binder-arm C and trip arm or lever D pass upward through a slot in the table or platform directly beneath the knotter E. The binder-arm C is secured upon the end of a shaft, F, running longitudinally through the lower arm of frame A, and the trip arm or lever D is secured upon the inner end of a shaft, G, carried by brackets or hangers a, cast on the lower arm of the frame, as more plainly shown in Fig. 2. The binder-arm shaft is provided at its outer end with a crank-arm, b, which is connected by a pitman, c, with a pivoted yoke, H, which is raised and lowered at intervals by a crank-arm, d, of a shaft, I, running through the upper arm of the frame, and carrying at its inner end a combined cam and gear wheel, J, by which the knotter E is operated. The shaft I also carries at its outer end a large gear-wheel, K, which receives motion at proper times from a pinion, L, on the packer-shaft M, said pinion being loosely mounted and free to rotate upon a sleeve, e, of a drive-wheel, N, which is the prime mover of the binding attachment, but which receives its motion from the harvester in the ordinary manner. When the packers are in operation the main drive-wheel N is locked to the packer-shaft M, upon which it is mounted, and imparts the necessary motion thereto, the pinion L being at such time loose upon the sleeve of the drive-wheel, and consequently not turning therewith. When, however, the packers have completed their work of forming and compressing the gavel, and the binding operation proper is to begin, the drive-wheel N is disconnected from the packer-shaft and permitted to rotate freely thereon, the pinion L being, however, simultaneously locked to the sleeve of said drive-wheel, and therefore caused to impart motion to the gear-wheel K and its shaft I, and through them to the band applying and fastening devices. To bring about this simultaneous locking of one and unlocking of the other of the parts is the office of the trip arm or lever D, and I will now explain the manner in which it effects this object.

As shown in Figs. 1 and 3, and more plainly shown in Fig. 8, the drive-wheel N is made fast upon an elongated hub or sleeve, e, which has formed upon its inner end an S-shaped block, f, which rotates continuously with the sleeve and drive-wheel N. Between the block f and wheel N is placed the pinion L, which is loose upon the sleeve e, but is provided with a dog, g, by which it may be locked to the block f, and caused to rotate therewith for the purpose of imparting motion to the wheel K, and through it to the band applying and fastening mechanism.

The dog g consists, as more plainly shown in Figs. 5 and 10, of a lever pivoted about midway between its ends to the side face of pinion L, having its outer end provided with a laterally-projecting stud or roller, h, and a longitudinally-projecting point or nose, i, and its tail or inner end pressed outward from the center of the pinion by a spring, j. The stud projects from the face of the dog a little less than one-half the width of the block f, which it overhangs, and with which it locks or engages at certain times, as mentioned, the roller h at such times taking into one of the notches k of the block, and thus causing the block to carry with it the dog and the pinion L, to which the dog is attached. The springs j tend to hold the dog in engagement with the block f at all times except when the tail is acted upon and pressed inward. The stud is made slightly less than half the thickness of the block in order to afford room for a similar stud overhanging the block from the other side, as presently explained.

The packer-shaft M is provided with a radial arm, l, carrying a dog, m, in all respects similar to the dog g, except that the point or nose at the outer end is omitted, and a finger, n, projecting from the body of the dog at substantially right angles, is substituted. The dog is provided with a spring, o, which urges its tail outward, and tends constantly to throw its projecting stud or roller p inward toward the shaft, and to cause said stud or roller to engage with the constantly-revolving block f, which it overhangs, in precisely the same manner as explained in regard to dog g. The dogs g and m are caused to act alternately, one releasing itself from the block f as the other engages therewith; hence motion is imparted for a time to the packer-shaft M, the shaft I meanwhile remaining at rest. Then the packer-shaft comes to rest, and the shaft I rotates to cause the binding of the gavel accumulated and compressed by the packer-arms.

To cause the proper engagement and disengagement of the dogs, I employ the mechanism shown in Fig. 5, in which D represents the trip-arm, against which the grain is pressed by the packer-arms, and which will be held by a spring, q, Fig. 2, or equivalent means, to move only when a given pressure is reached, said arm being made fast upon a shaft, G, which carries at its outer end a crank-arm, r, from which a pitman, s, extends to a pivoted or swinging lever, O, moving upon a pivot, t, which also constitutes the support, and is the center of motion of the yoke H. The free end of lever O is furnished with a laterally-projecting pin or stud, u, extending into or through a slot, v, in the lower end of a dog or hook-shaped lever, P, pivoted to the moving end of yoke H. The dog or hooked lever P is placed directly in line with the dog g, and when the yoke H is down, as shown in Fig. 5, and the trip-arm D is in an upright position, as also shown in said figure, the hook w of the lever or dog P stands directly in the path of the dog g, and, engaging the nose i thereof, lifts the stud or roller h from the notch k of block f, thus disconnecting the pinion L, and consequently the gear-wheel K and shaft I, from the driving-wheel N, and permitting the latter to rotate and to operate the packers, which, through their shaft M and dog m, now become connected with block f and wheel N. When, however, the trip-arm D is moved back by the pressure of the grain, the rock-shaft G is turned, throwing up the arm r and pitman s, thereby elevating the lever O and causing stud u to travel in the slot v of dog or lever P, and thereby to rock the said dog or lever upon its pivot, throwing its nose or hook upward and backward and causing it to release the nose i of dog g. As the dog $g$ is thus released by the dog or lever P, its spring $j$ throws the stud or roller $h$ against the face or edge of block $f$ and causes it to take into one of the notches $k$. The pinion L, being thus locked to the block $f$, and thereby caused to rotate with wheel N, imparts motion to wheel K and shaft I, which latter, rotating and carrying with it the arm $d$, causes said arm, or the roller $x$, with which it is preferably furnished, to elevate the yoke H, within which it turns, as shown in Fig. 5. As the yoke moves upward it carries with it the pitman $c$, thereby raising crank-arm $b$ and imparting a rocking motion to shaft F, causing the binder-arm C to swing upward through the grain table or platform, and to carry the band around the gavel and to the tying and severing mechanism, as will be understood by referring to Fig. 4. In thus moving upward, the pitman $c$ brings a finger, $y$, with which it is provided, into the path of the finger $n$ of the dog $m$, as will be readily understood from Fig. 5, and as the dog $m$ moves forward, the finger $n$, coming into contact with the finger $y$, is rocked upon its pivot, and its stud or roller $p$ is drawn out of the notch $k$ of block $f$, and the packer-shaft M is released or disconnected from said block, and consequently from the driving-wheel N. Thus during the rotation of the wheel K and shaft I, and the consequent operation of the band applying and fastening mechanism, the packers remain inoperative. As the shaft I completes its revolution, during which the operation of the said band applying and fastening devices is completed, the roller $x$ draws down the yoke H, bringing hook or dog P into position to again intercept the dog $g$, and also carrying the finger $y$ below the finger $n$ of dog $m$, allowing its roller or stud $p$ to be thrown into one of the notches $k$ of block $f$, and thereby to connect the packer-shaft M with the driving-wheel N just as the wheel K and shaft I are disconnected therefrom through the withdrawal of dog $g$ by lever or dog P.

As seen in Fig. 4, the trip arm or lever D is formed with a second arm, D′, which constitutes a bundle-ejector, and to impart to this second ejector the requisite motions at the proper times I provide the lever O with a stud or roller, $z$, which is arranged to project into a cam-groove, $a'$, in the face of gear-wheel K, the lever O being connected with shaft G, on which the trip and ejector are mounted, through pitman $s$ and arm $r$, as above explained. The groove $a'$ is of the shape shown in Fig. 7, being widened at the bottom (which is that part wherein the stud $z$ rests while the gavel is forming) to permit the slight rise occurring when the trip-arm first moves back to raise the dog or lever P, and then of a shape to move the trip-arm inward slightly to compress the gavel, then running parallel with the periphery of the wheel to cause the arm D to remain at rest while the tyer operates, and finally running in a curved line back to the starting-point, this latter portion being of such shape as to first raise the lever O, and thereby throw back the trip-arm D, and cause the ejector D′ to swing upward through the grain table or platform and to discharge the bundle, and then to resume the position shown in Fig. 4. It will of course be understood that the curvature or formation of the groove $a'$ is necessarily modified, and different from what it would be if the lever O merely swung upon its pivot as actuated by the cam-groove $a'$, because said lever is raised and lowered by the yoke H, with which it is connected, through dog or lever P.

As seen in Figs. 5 and 12, the yoke H has two portions of its open center curved concentrically with the shaft I, or on the arc of a circle of a radius equal to the distance from the center of shaft I to the outer face of roller $x$, so that in moving over said portions of the yoke the roller $x$ imparts no motion to the same. The yoke is in consequence of this construction raised to its highest point, which throws the binder-arm upward and forward to the position shown by dotted lines in Fig. 4, where it remains until the knot is formed, the roller $x$ at this time traveling over or against the upper curved face of the opening in yoke H, and just as the knot is completed and the bundle discharged the roller depresses the yoke, and then enters the lower curved portion of the yoke, and while moving over this the trip-arm and bundle-ejector are returned to their first position. By thus making the yoke open in the center, instead of forming a cam-groove in it, I am enabled to get the required motion and to employ a continuous straight shaft passing through the yoke, the crank-arm $d$ being merely keyed or bolted upon the shaft, and therefore readily adjustable to its proper position relatively to the other parts. This is a feature of considerable importance, since the use of a bent or forged shaft increases the cost of building the machine and renders the adjustment of parts more difficult.

The packers are shown in Figs. 1, 3, and 4, the latter figure showing more clearly the manner in which they are operated.

$b'$ represents a bracket or hanger-frame bolted to the main frame A, and supporting an elevated platform or bed-plate, $c'$, which supports the cutter and other parts hereinafter described. The bracket or frame $b'$ is formed with arms $d'$, which overhang the plate $c'$, which in turn overlies the grain table or platform B. In these arms is carried one end of the packer-shaft M, and between the arms the shaft is provided with two cranks, $e'$, projecting in opposite directions from the shaft, and each working in a slotted arm, $f'$, pivoted to an upward extension of the arm $b'$. The slotted arms $f'$ are each provided with a swinging tooth or finger, $g'$, which is free to swing toward the knotting mechanism, but is furnished with a stop, $h'$, to prevent its swinging in the opposite direction beyond a substantially vertical position. As the cranks $e'$ travel around they cause the arms $f'$ to rise and fall and to swing about their pivots, carrying the fingers or teeth $g'$ upward and backward through and above or near the face of bed-plate or platform $c'$, the finger yielding to pass freely over the incoming grain; but as the finger descends it enters the stream of grain, and, locking against the rear side of arm $f'$, swings forward therewith, carrying the grain before it. The two arms $f'$ and their fingers $g'$, acting alternately, cause the grain to be steadily and uniformly fed and packed. The bracket or frame $b'$ serves to support and carry the working parts of the tying mechanism, and arms $i'$, bolted to the opposite end of frame A, serve to support and carry the yoke H, the packer-shaft, and other moving parts. By thus making the arms or supports separate and bolting them to the frame A they can be readily renewed if broken or injured, and can be more readily and perfectly cast in the first instance.

The knot-tying mechanism will now be explained in connection with Figs. 13 to 20, inclusive.

The tyer proper, E, consists of a fixed jaw, $j'$, formed upon the lower end of a tubular stem or body, $k'$, and a movable jaw, $l'$, carried by a rod or stem extending through the body $k'$ and swiveled in an overhanging spring-arm, $m'$. The body or tubular stem $k'$ carries at its upper end a pinion, $n'$, which is caused to make one complete revolution just after the binder-arm passes the band around the gavel, and then is held stationary while the loop is stripped off the jaws, the band severed, and the knot drawn tight and the ends finally released, the rotation being effected by teeth $o'$ on the face of the driving or operating wheel J, and the pinion being cut away on one side, so as to bear against the face of the wheel J, and to be thereby held against turning, except when meshing with the teeth $o'$. The periphery of wheel J is also furnished with two cam projections or inclines, $q'$ and $r'$, the first of which opens the jaws, by raising the spring-arm $m'$ just as the jaws complete their revolution and finish the loop, for the purpose of receiving the ends of the band or the two strands which afterward form said ends, and the second of which again separates the jaws after the knot is drawn tight, to release the ends of the band. The wheel J is also provided with a groove, $s'$, into which projects the tail of a swinging elbow-lever, Q, said tail being preferably furnished with an anti-friction roller, $t'$, as shown. The arm or lever Q is slotted to permit it to swing over a stationary blade or cutter, R, as shown in Figs. 2 and 4, thus protecting the cord which passes over said arm from the knife or cutter, and the arm Q is further provided with a clamping-wheel or cord-holder, S, which is turned by a stationary spring-pawl, T, upon the bed or platform $c'$, as the arm is swung outward by the rotation of wheel J, and the consequent depression of the tail of said arm. On the side of the arm next to the knotter, and extending beneath the latter, is a cord-guide, U, consisting of two diverging fingers, $u'$, between which the cords or strands are laid by the band-carrying arm, which, passing over the clamping-wheel S, lays the new strand between two of the arms of said wheel, which, being turned by the pawl T, acting on the ratchet $v'$, carries said strand between the wheel and the face or wall of the slot in which it turns, as will be readily understood. This is done just as the arm or lever Q begins to swing outward, causing the strand to be seized before the two strands—the new one and the old one caught and retained in the same manner, at the previous operation of the tying mechanism, by a preceding arm of the wheel S—are severed. A dog or pawl, $w'$, prevents the backward rotation of the wheel S. The cord passes from a reel or spool at any convenient point along a groove in the outer face or back of the binder-arm until it reaches an eye or hole near the point of said arm, through which it passes to the cord-holder, as shown in Fig. 4. The point of the binder-arm moves past the blade or cutter R and wheel S, and the cord runs back over the wheel in front of the blade, over the jaws $j'$ $l'$, and down to the gavel beneath, through the guide U. The strands being thus laid over the jaws, and the band-carrying or binder arm being in the position shown in Fig. 4 in dotted lines, the tyer rotates, winding the two strands from the position shown in Fig. 16 into a loop, as in Fig. 17, an inclined or cam tail, $x'$, causing the loop to ride down under the jaws, as shown in the latter figure. Just before the jaws complete their rotation they are separated by the incline $q'$ of wheel J riding under and lifting the spring-arm $m'$, to permit the strands passing to the cord-holder and binder-arm to enter. The jaws then close upon the strands, and the arm or lever Q swings outward, carrying with it the guide U, which is thus made to act as a stripper and removes the loop from the jaws, at the same time carrying the strands in rear of the loop, or between the loop and the cord-holder, against the cutter R, which severs the applied band. The further movement of the arm Q and guide U serves to draw the knot tight, and then the incline $r'$ of wheel J raises jaw $l'$ and releases the ends of the band, at which instant the bundle-discharger D' rises and throws out the bundle. As the jaws depend entirely upon spring-pressure to keep them closed together, the importance of employing a large and strong spring will be seen, and for this reason the arrangement here shown is peculiarly advantageous in a tyer of this type. The spring is slotted and held at any desired adjustment by a clamping-screw, V.

Any approved form of tension or take-up device may be employed, and parts not described may be of usual construction.

Having thus described my invention, what I claim is—

1. In combination with a packer substantially such as shown and described and a driving-shaft, M, therefor, provided with a dog, m, a driving-wheel, N, provided with a notched block, f, and mounted loosely upon said shaft, and means, substantially such as shown and described, for automatically withdrawing dog m from engagement with block f.

2. In combination with a packer-shaft, a driving-wheel provided with a tubular sleeve, and having a notched block or wheel at its end, the whole mounted loosely upon said shaft, a loose wheel or pinion mounted upon the sleeve of the driving-wheel, a dog pivoted to the side of said loose wheel, and overhanging the notched block, and a second dog carried by the packer-shaft, and likewise overhanging said block, and means, substantially such as described and shown, for simultaneously engaging one dog and releasing the other.

3. In combination with shaft M, provided with dog m, having the finger n, the driving-wheel having the sleeve e and notched block f, the wheel or pinion L, mounted loosely on sleeve e, and provided with dog g, and the dog or lever P and finger y, adapted and arranged to act upon the dogs m and g, as set forth.

4. In combination with wheel K, secured upon shaft I, the pinion L, provided with dog g, and mounted loosely on sleeve e of the driving-wheel N, the dog or lever P, the lever O, pitman s, crank-arm r, shaft G, and trip-arm D, secured upon said shaft, all arranged and operating substantially as shown and described.

5. In combination with shaft M, carrying-dog m, having finger n, and with wheel or pinion L, carrying dog g, a hook or dog, P, and finger y, arranged to rise and fall simultaneously, or substantially so, whereby one of the dogs m and g is thrown out of action and the other permitted to go into action, as set forth.

6. In combination with the driving-wheel N, having notched block f, loose wheel or pinion L, carrying dog g, and pivoted hook or dog P, having a slotted rear end, lever O, having a stud working in the slotted end of hook P and connected with trip-lever D, substantially as shown and described.

7. In combination with shaft M, carrying dog m, having finger n, loose driving-wheel N thereon, having sleeve e and notched block f, loose pinion L, provided with dog g, and mounted on sleeve e, a vertically-moving yoke, H, provided with dog or hook P, and connected with the binder-arm shaft by a pitman provided with finger y, lever O, connected with dog or hook P, substantially as described, and trip-arm D, connected with lever O through shaft G, crank-arm r, and pitman s.

8. In combination with dogs m and g, arranged, substantially as described and shown, to lock either the packer-shaft or the knotter-operating shaft to the drive-wheel, a vertically-moving yoke carrying a hook, P, and a finger, y, and adapted to elevate one and depress the other simultaneously, whereby the dogs are caused to lock the packer-shaft and the knotter-operating shaft to the drive-wheel alternately.

9. In combination with shaft G, carrying ejector D', lever O, connected by a pitman with said shaft, and having its outer end provided with a pin working in a slotted hook or dog pivoted to a yoke, H, whereby the lever O is caused to rise and fall with the yoke, and cam-wheel K, having groove a' to receive a stud or roller projecting from lever O, whereby the movements of said lever and of the parts actuated thereby are modified and timed, as explained.

10. In combination with the intermittingly-operated shaft I, having arm d, and the yoke H, carrying hook P, and connected by pitman c with the binder-arm shaft F, lever O, connected with hook P and with ejector-shaft G, and having stud or roller z extending into cam-groove a' of wheel K, whereby the proper relative movements of the band-carrying or binder arm and the ejector are produced.

11. The herein-described packing mechanism, consisting of two or more slotted arms pivoted at one end, and provided at the opposite end with swinging fingers having a limited outward play, and a double crank working in the slots in the respective arms, substantially as shown and described.

12. In combination with shaft M, having cranks e', slotted arms f', pivoted at one end, and provided at the opposite end with swinging fingers g', having stops h', substantially as shown and described.

13. In combination with the grain-table B and slotted overlying platform or bed-plate c', the packing mechanism consisting of swinging fingers g', carried by slotted arms f', pivoted at one end and swung upon their pivots by cranks e', whereby the fingers are permitted to swing back freely over the grain into or through the slots in the bed-plate, then to descend, project through the slots, and enter the stream of grain and move the same forward.

14. The herein-described knot-tying mechanism, consisting of tubular body k', having jaw j' formed upon one end, and provided with pinion n' at its opposite end, movable jaw l', pivoted in spring-arm m', and cam and gear wheel J, having inclines q' r' and gear-section o'.

15. In combination with tyer E, having pinion n', cut away on one side, and overhanging spring-arm m', the wheel J, provided with gear-section o', and with a plain or straight face extending from one end of the gear-section around to the other, and also provided with inclines q' r', as and for the purpose set forth.

16. The herein-described tyer, consisting of rotary tubular body k', provided at one end with pinion n' and at the opposite end with stationary jaw j', sliding jaw l', and external spring-arm, m', having the rod or stem of the sliding jaw in it, substantially as shown and described, said spring-arm being adapted to act both as a spring and as a lifting arm.

17. In combination with the tyer E and wheel J, the adjustable external spring-arm, $m'$, secured upon the binder-frame, and having the stem of the movable tyer-jaw swiveled in it, as and for the purpose set forth.

18. In combination with a knot-tyer, a swinging or reciprocating arm, Q, provided with a rotary cord clamp or holder, S, and a spring-pawl, T, fixed upon the framing of the machine and arranged to rotate the cord-holder, as explained.

19. In combination with a tyer and with a stationary cutter, a swinging or reciprocating stripper-arm slotted to swing over and shield the cutter, substantially as set forth.

20. In combination with tyer E, constructed substantially as shown and described, cam and gear wheel J, and elbow-lever Q, carrying stripper U and cord-holder S and the stationary knife, said parts being arranged to operate substantially as explained, whereby the jaws of the knotter are caused to seize the strands passing toward the cord-holder as the loop is completed, then the stripper is caused to remove the loop from the jaws to draw the strands against the knife and to draw the knot tight, and finally the jaws are caused to open to release the ends of the applied band.

21. The combination, substantially as shown and described, of tyer E, wheel J, elbow-lever Q, carrying stripper U and cord-holder S and a stationary cutter, and spring-pawls R and T, all arranged and operating as explained.

PETER J. OLSON.

Witnesses:
WILLIAM W. DODGE,
WALTER S. DODGE.